United States Patent [19]

Steigerwald

[11] Patent Number: 5,570,212
[45] Date of Patent: Oct. 29, 1996

[54] ANTIREFLECTOR BLACK MATRIX FOR DISPLAY DEVICES COMPRISING THREE LAYERS OF ZINC OXIDE, MOLYBDENUM, AND ZINC OXIDE

[75] Inventor: Michael L. Steigerwald, Martinsville, N.J.

[73] Assignee: Lucent Technologies Inc., Murray Hill, N.J.

[21] Appl. No.: 410,174

[22] Filed: Mar. 24, 1995

Related U.S. Application Data

[63] Continuation-in-part of Ser. No. 351,969, Dec. 8, 1994.
[51] Int. Cl.$^6$ .................. G02F 1/1333; G02F 1/1335
[52] U.S. Cl. .................. 359/67; 359/68; 428/332
[58] Field of Search .................. 359/67, 66, 68; 428/432, 209; 430/5; 204/192.26, 192.27, 192.28

[56] References Cited

U.S. PATENT DOCUMENTS

| | | | |
|---|---|---|---|
| 4,139,443 | 2/1979 | Sakurai | 204/192 |
| 4,166,148 | 8/1979 | Sakurai et al. | 428/332 |
| 4,296,422 | 10/1981 | Kawaziri et al. | 346/160 |
| 4,363,846 | 12/1982 | Kaneki | 428/203 |
| 4,692,653 | 9/1987 | Kushida et al. | 310/334 |
| 4,720,442 | 1/1988 | Shinkai et al. | 430/5 |
| 4,857,161 | 8/1989 | Borel et al. | 204/192.26 |
| 5,069,771 | 12/1991 | Nguyen et al. | 204/292 |
| 5,111,179 | 5/1992 | Flassayer et al. | 338/313 |
| 5,129,132 | 7/1992 | Zdeblick et al. | 29/25.35 |
| 5,271,994 | 12/1993 | Termath | 428/216 |
| 5,389,474 | 2/1995 | Iguchi et al. | 430/5 |
| 5,407,733 | 4/1995 | Bjornard et al. | 359/580 |
| 5,413,864 | 5/1995 | Miyazaki et al. | 359/580 |
| 5,419,969 | 5/1995 | Miyazaki et al. | 359/580 |

FOREIGN PATENT DOCUMENTS 5-127014  9/1993  Japan.

OTHER PUBLICATIONS

T. Koseki et al. "Color Filter for 10.4-in.-diagonal 4096-color thin-film-transistor liquid crystal displays" *IBM J. Res. Develop.*, vol. 36, No. 1 (1992).

*Primary Examiner*—Anita Pellman Gross
*Assistant Examiner*—Toan Ton

[57] ABSTRACT

A black matrix structure suitable for use in an active matrix liquid crystal display is described. The novel antireflective black matrix comprises successive layers of zinc oxide, molybdenum, a second layer of zinc oxide and a molybdenum mirror, all of which are deposited upon the front surface of a glass substrate member. An alternative structure includes the same sequence of layering on the back surface of the molybdenum mirror. The described black matrixes reduce reflectance of incident light to less than 0.5%. A technique for the preparation of the described structure involving cathodic sputtering is also described.

7 Claims, 1 Drawing Sheet

ANTIREFLECTOR BLACK MATRIX FOR DISPLAY DEVICES COMPRISING THREE LAYERS OF ZINC OXIDE, MOLYBDENUM, AND ZINC OXIDE

CROSS-REFERENCE TO RELATED APPLICATION

This application is a continuation-in-part of U.S. application Ser. No. 08/351,969 filed Dec. 8, 1994, which is hereby incorporated herein by reference.

FIELD OF THE INVENTION

This invention relates to liquid crystal display devices. More particularly, the present invention relates to active matrix liquid crystal displays including an antireflective black matrix and to a technique for the preparation thereof.

BACKGROUND OF THE INVENTION

During the past two decades, there has been a birth of interest in a class of devices commonly referred to as electroluminescent displays which are solid state devices that use the direct production of light in thin films to provide displays of satisfactory appearance at moderate cost.

This technology led to the development of liquid crystal displays based upon a phenomenon known as dynamic scattering wherein current is passed through a nematic liquid crystal, so causing the material to break up into domains having randomly directed axes. The next stage in the development of such devices involved the fabrication of a twisted nematic display in which a nematic liquid crystal is disposed intermediate two closely spaced glass plates coated with a polymer and rubbed such that the nematic liquid crystal is aligned parallel to the rubbing direction. If the plates are robbed at 90 degree angles, the liquid crystal deforms into a twisted structure. Passage of polarized light through the display results in the plane of polarization following the twist. The application of an electric field to the display permits the liquid crystals to rotate and align themselves with the field, thereby leading to disruption of the twist and rotation of polarization. This permits either full transmission or no transmission in the display.

Later developments in the field led to the generation of thin film transistor/liquid crystal displays and to color liquid crystal displays. In the case of the latter, workers in the art have recognized that a reduction in efficiency is ofttimes encountered by absorption of light in the color filters. Accordingly, efforts have continued to alleviate or eliminate this limitation.

Heretofore, the most common technique for overcoming this problem has been to design an active matrix liquid crystal display including a glass substrate (front glass plate) having a black matrix typically comprising chromium oxide deposited upon a portion thereof. The purpose of this matrix is to define and outline individual pixels which is of particular importance for color displays in providing a separator between the elements of the color filter from each other.

Additionally, the black matrix serves to mask the electronics on the back plate of the device, thereby providing protection therefor from ambient light and associated photodegradation.

Black matrix structures employed heretofore typically comprise a grid of black lines, usually of the order of 20 nanometers in thickness spaced so as to provide an array of open opaque rectangles, typically 100 μm on a side. The black matrix is also chosen to minimize reflection of light which tends to result in the degradation of the display.

In the past, numerous approaches for attaining this end have been employed by those skilled in the art. Thus, for example, black matrixes have included grids made from (a) dyed black photoresists, (b) photoresists impregnated with carbon black, (c) patterned chromium, (d) patterned chromium/chromium oxide, and (e) patterned chromium/chromium oxide/chromium trilayers. Both the bilayer and the trilayer structures have been engineered to minimize reflectance of the matrix. Studies have revealed that the best of the matrixes among these prior art structures evidences an average reflectance of approximately 3%. Accordingly, efforts have continued in the search to enhance this characteristic.

SUMMARY OF THE INVENTION

In accordance with the present invention, this end has been attained by the fabrication of a novel black matrix structure which has evidenced the ability to reduce reflectance of incident light to less than 0.5%.

The structure of interest is constructed of four layers deposited successively upon the back side of a suitable front glass substrate member, the layers being comprised of zinc oxide, molybdenum, zinc oxide and a molybdenum mirror. Alternatively, the structure may be double sided and include a black matrix of the same type on the back side of the molybdenum mirror employed herein, so forming a seven layer structure.

BRIEF DESCRIPTION OF THE DRAWINGS.

The invention will be more readily understood by reference to the following detailed description taken in conjunction with the accompanying drawing wherein.

DETAILED DESCRIPTION OF THE INVENTION

Figure 1:
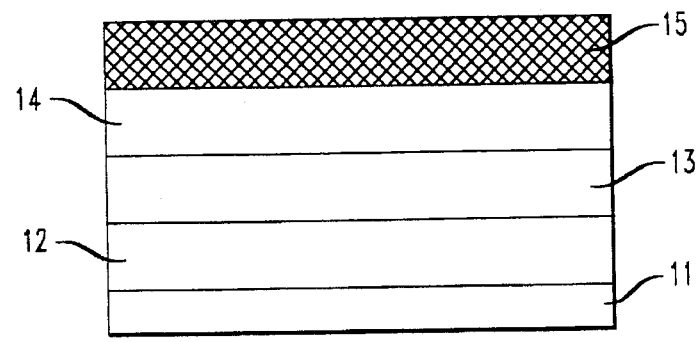
FIG. 1 is a front elevational view in cross-section of a four layer black matrix structure prepared in accordance with the present invention.

The first step in the practice of the present invention involves selection of a suitable substrate for use in the liquid crystal display to be prepared. For this purpose, it is common practice to employ a conventional glass plate obtained from commercial sources. The glass plate so chosen is then placed within a cathodic sputtering chamber having a zinc target and reactive sputtering effected in the presence of oxygen to yield a first zinc oxide layer on the substrate having a thickness ranging from 35–60 nanometers. Alternatively zinc oxide may be deposited by sputtering from a zinc oxide target.

Thereafter, the oxygen flow in the chamber is terminated and the zinc target either kept in place or replaced by a molybdenum target. Then, sputtering is effected to yield a molybdenum coating upon the first zinc oxide coating having a thickness ranging from 6 to 11 nanometers. The thickness of the metal film is dictated by considerations relating to minimizing the reflectance of the front face of the entire structure.

Next, the zinc target is again inserted in the sputtering chamber (if previously removed) and reactive sputtering in the presence of oxygen again effected to yield a second zinc oxide layer upon the metal layer, said second zinc oxide layer having a thickness ranging from 35–50 nanometers. Thickness of the second zinc oxide layer is also determined by considerations relating to minimizing the reflectance of the front face of the entire structure.

Then, a molybdenum mirror is deposited upon the second zinc oxide layer by cathodic sputtering of molybdenum in the sputtering chamber employed in the practice of the invention to yield the desired four layer black matrix which has been found to reduce the reflectance of incident light to less than 0.5%. The black matrix structure is then removed from the sputtering chamber and patterning effected by conventional photolithographic techniques including etching to define the desired pixel windows. Studies have revealed that the thicknesses of the three middle layers of the black matrix structure of the invention are interdependent and critical. It will be noted that average reflectances in each case are significantly lower than those reported for similar prior art structures.

In Table I set forth below, a detailed analysis of the characteristics of a black matrix structure in accordance with the present invention is shown.

TABLE I

| Mo mirror/ZnO/Mo/ZnO Antireflector | | | |
|---|---|---|---|
| ZnO 1 | Mo | ZnO 2 | R |
| 46.69 | 5 | 50.72 | 1.8 |
| 46.69 | 6.25 | 50.72 | 0.3 |
| 46.69 | 7.37 | 50.72 | 0.06 |
| 46.69 | 8.75 | 50.72 | 0.6 |
| 46.69 | 10 | 50.72 | 1.7 |
| 40 | 7.37 | 50.72 | 0.5 |
| 46.69 | 7.37 | 50.72 | 0.06 |
| 50 | 7.37 | 50.72 | 0.15 |
| 46.69 | 7.37 | 40 | 0.8 |
| 46.69 | 7.37 | 50.72 | 0.06 |
| 46.69 | 7.37 | 55 | 0.2 |
| 46.69 | 7.37 | 60 | 0.6 |

Mo mirror: 100 nm thick
R = average relfectance between 40 nm and 700 nm film thickness in nm
ZnO 1 is adjacent to mirror; ZnO 2 is adjacent to glass The Table reveals that although layer thicknesses are critical to the performance of the multilayer stack, variations may be made from the optimum values to yield a structure evidencing satisfactory low reflectance characteristics. This is of particular significance in the four layer structure and is a decided advantage over three layer structures which have more limited tolerances.

It should be noted that molybdenum and zinc oxide are of particular significance due to etching considerations. As noted previously, the most efficient procedure for fabricating the black matrix of the invention involves depositing films of the constituent components over the entirety of the black surfaces of a front glass substrate of the desired device and then etching out pixel windows. Molybdenum and zinc oxide are uniquely suited for this approach since zinc oxide and molybdenum can both be etched by the same etchant, so assuring that patterning of the black matrix can be effected in one photolithographic etching step, thereby assuring further economies in the preparation thereof.

With reference now to FIG. 1, there is shown a front elevational view in cross-section of a typical black matrix structure in accordance with the invention. Shown in the figure is a glass substrate 11 having deposited thereon successively on the back side thereof a first layer of zinc oxide 12, a molybdenum layer 13, a second layer of zinc oxide 14 and molybdenum mirror 15.

Figure 2:
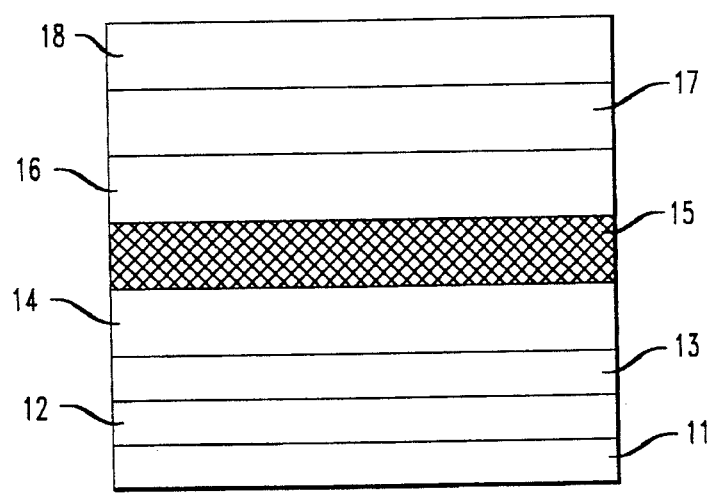
FIG. 2 is a front elevational view in cross section of a seven layer black matrix structure prepared in accordance with the invention.

A structure equal in use to that shown in FIG. 1 may be prepared by depositing the same antireflective coating on the back side of the chromium mirror of the four layer stack of FIG. 1. Such a structure is shown in FIG. 2 and this structure comprises a first zinc oxide layer 16, a second molybdenum layer 17 and a second zinc oxide layer, 18. This double-sided seven layer structure is antireflective with respect both to ambient light incident from outside the display device and to light from the backlight that is integral to the device, light which otherwise would be reflected back into the display electronics.

Figure 3:
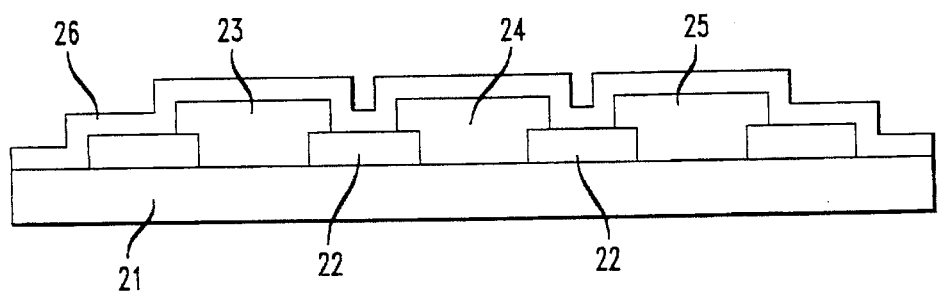
FIG. 3 is a front elevational view in cross section of a color filter including the black matrix of the invention as destined for use in a thin film transistor liquid crystal display.

With reference now to FIG. 3, there is shown a front elevational view in cross-section of a color filter including the black matrix of the invention as depicted in FIG. 1 or FIG. 2 herein. The color filter shown is suitable for use in a thin film transistor liquid crystal display.

Shown in FIG. 3 is a glass substrate 21 having deposited thereon a pattern of black matrix structures 22 prepared as described herein by photolithographic techniques. Matrixes 22 serve as spacers between color filter elements 23, 24 and 25 which are typically, red, green and blue filters, respectively. Deposited upon the top surface of the structure is an electrode, for example, indium tin oxide.

Based upon the data set forth in Table I, it is evident that the black matrixes prepared in accordance with the described technique evidence superior antireflective characteristics to those of the prior art and offer workers in the art a viable conduit to commercial applications.

While the invention has been described in detail in the foregoing description, it will be appreciated by those skilled in the art that many variations may be made without departing from the spirit and scope of the invention. Thus, for example, zirconium and titanium may be employed as the metal member of the black matrix structure. However, it will also be understood by those skilled in the art that such substitution will necessitate alternate means for removal thereof in unwanted areas of the glass substrate since these materials cannot be etched by standard photolithographic techniques. It will also be understood by those skilled in the art, that during the sputtering process, variations may occur in the nature of the product deposited.

The invention claimed is:

1. An active liquid crystal display including an antireflective black matrix deposited upon the back side of a glass substrate member comprising successively a first zinc oxide layer with a thickness in the range of 6–11 nanometers, a molybdenum layer with a thickness in the range of 35–60 nanometers, and a second zinc oxide layer with a thickness in the range of 35–50 nanometers and a molybdenum mirror.

2. Display in accordance with claim 1 further comprising a first zinc oxide layer, a molybdenum layer and a second zinc oxide layer on the back surface of said molybdenum mirror.

3. Method for the fabrication of an antireflective black matrix for use in a thin film transistor liquid crystal display which comprises the steps of (a) depositing a first layer of zinc oxide upon the back side of a front glass substrate in a thickness ranging from 35–60 nanometers;

(b) depositing upon said first layer a layer of molybdenum in a thickness ranging from 6–11 nanometers, (c) depositing a second zinc oxide layer upon the molybdenum layer in a thickness ranging from 35–50 nanometers; and (d) depositing a molybdenum mirror upon said second zinc oxide layer.

4. The method of claim 3 wherein at least one layer of zinc oxide is deposited by reactive sputtering of zinc in the presence of oxygen.

5. The method of claim 3 wherein said layer of molydbenum is deposited by cathodic sputtering.

6. The method of claim 3 wherein at least one layer of zinc oxide is deposited by cathodic sputtering of zinc oxide.

7. Display in accordance with claim 1 wherein said antireflective black matrix reduces the reflectance of incident light to less than 0.5%.

* * * * *